T. KILROY.
APPARATUS FOR CONCENTRATING SULFURIC ACID.
APPLICATION FILED AUG. 18, 1915.
1,211,594.
Patented Jan. 9, 1917.
2 SHEETS—SHEET 1.
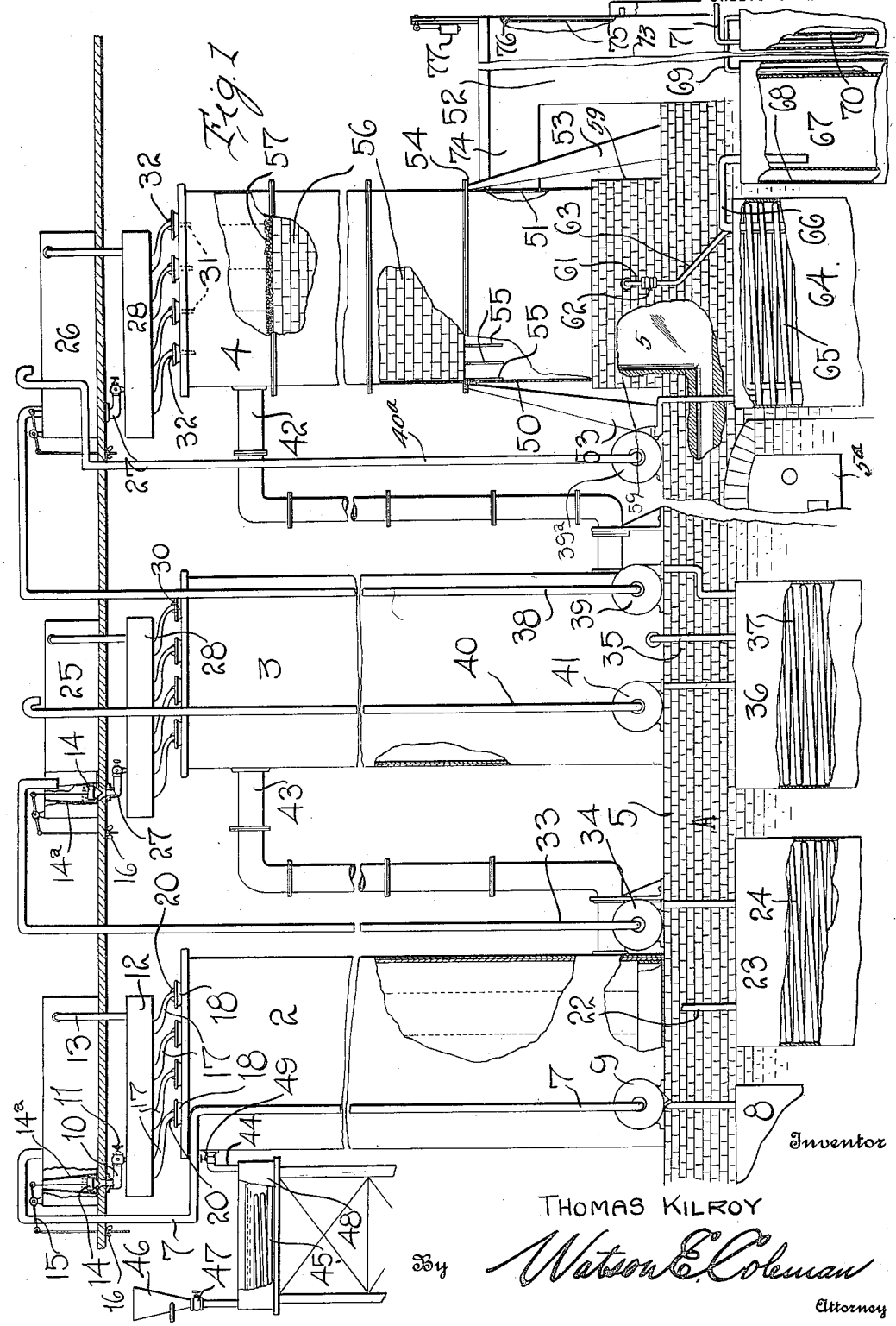
Inventor
THOMAS KILROY
By Watson E. Coleman
Attorney T. KILROY.
APPARATUS FOR CONCENTRATING SULFURIC ACID.
APPLICATION FILED AUG. 18, 1915.
1,211,594.
Patented Jan. 9, 1917.
2 SHEETS—SHEET 2.
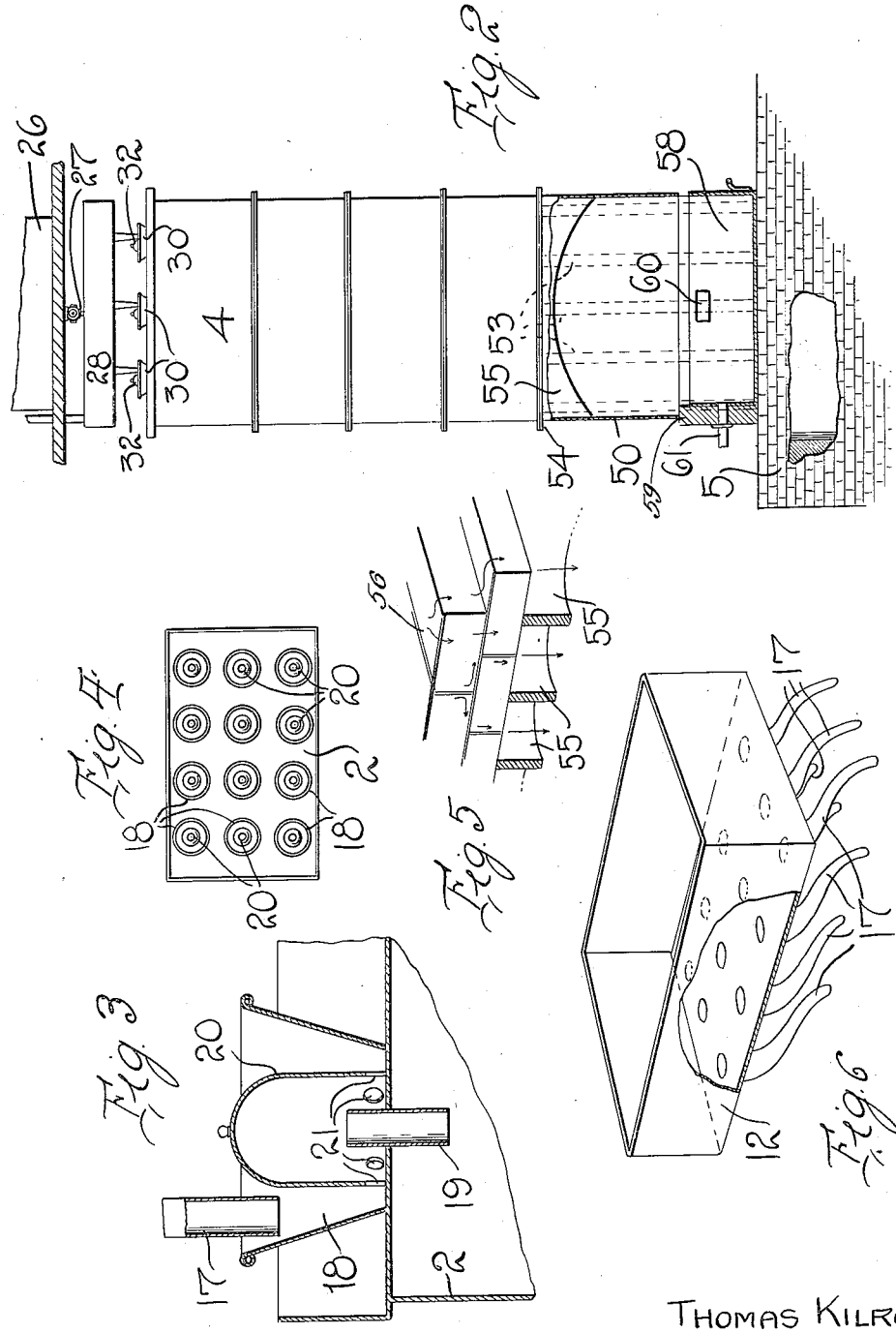
Inventor
THOMAS KILROY
By Watson E. Coleman
Attorney

UNITED STATES PATENT OFFICE.

THOMAS KILROY, OF BAYONNE, NEW JERSEY.

APPARATUS FOR CONCENTRATING SULFURIC ACID.

1,211,594.  Specification of Letters Patent.  Patented Jan. 9, 1917.

Application filed August 18, 1915. Serial No. 46,149.

*To all whom it may concern:*

Be it known that I, THOMAS KILROY, a citizen of the United States, residing at Bayonne, in the county of Hudson and State of New Jersey, have invented certain new and useful Improvements in Apparatus for Concentrating Sulfuric Acid, of which the following is a specification, reference being had to the accompanying drawings.

My invention relates to the manufacture of sulfuric acid, and particularly to the concentration of weak sulfuric acid.

The primary object of my invention is to provide a very simply constructed, cheaply operated, and effective apparatus, whereby relatively weak acid may be concentrated to a strength of 98% in an extremely economical manner, and in which practically no acid is lost and wherein such fumes as finally pass off are so weak that no damage will result therefrom to vegetation in the vicinity.

A further object of my invention is to improve upon certain details of construction in plants of this character, and particularly to provide for the removal of the lead pan used in conjunction with the final cooling tower so that the lead pan may be readily removed, repaired, and replaced in case it leaks.

Other objects will appear in the course of the following description.

My invention is illustrated in the accompanying drawings, wherein:

Figure 1 is a side elevation of a concentrating plant constructed in accordance with my invention, the several towers and tanks being partly broken away to show the internal construction; Fig. 2 is an elevation of the final concentrating tower partly in section; Fig. 3 is an enlarged sectional view of one of the sealing cups disposed at the top of each tower; Fig. 4 is a plan view of one of the towers showing the sealing cups therein; Fig. 5 is a perspective detail view of the arrangement of bricks and arches in the final concentrating tower; Fig. 6 is a perspective view of one of the tanks 12 and the spray nozzles 17.

Referring to these drawings, it will be seen that my concentrating plant comprises three concentrating towers, designated respectively, 2, 3 and 4; 2 being the first tower, 3 the second, and 4 the final concentrating tower. Both of the towers 2 and 3 are constructed in the same manner with a supporting framework of any suitable construction provided with a lead lining. The details of construction of these towers are not further described for the reason that towers of this character are well known and may be constructed in many different ways. The tower No. 3 is for strong acid and is of cast iron. These three towers 2, 3 and 4 rest upon a foundation A, of brick, cement or other suitable material formed to provide an oil burning furnace 5 beneath the tower 4 and having a furnace opening 5ª. This stoking may be of any suitable form and I do not wish to limit myself to the details of construction and arrangements shown.

Disposed above the tower 2 and supported thereover in any suitable manner is a tank 6 which is connected by means of a pipe 7 to a supply tank 8 which contains the first weak acid designed to be concentrated. The acid is forced upward through the pipe 7 into the tank 6 by means of a pump 9 which is illustrated as a centrifugal pump. The tank 6 has a discharge pipe 10, this discharge pipe being angular in form and being provided with a valve 11. The discharge pipe empties into a distributing tank or pan 12, and also emptying into this distributing tank is an overflow pipe 13 which opens into the upper portion of the tank 6. Controlling the passage of the acid through the discharge pipe 10 is an emergency plug 14 which is connected to a lever 15 supported in any suitable manner, the outer end of this lever being connected to a screw-threaded rod engaged by a nut 16ª, whereby the valve may be adjustably controlled. The valve is inclosed within a perforated boot, preventing sediment from interfering with and stopping up the distributing cups.

Extending from the distributing tank 12 are a plurality of angularly arranged distributing nozzles 17. Each of these nozzles is flared at its upper end at the point of its entrance in the pan or tank 12, and the lower end of each nozzle discharges into a distributing cup 18. There are a plurality of these cups 18 mounted upon the upper end or top of the tower 2, this upper end or top of the tower being depressed below the tower walls, as illustrated in Fig. 3.

Extending from each cup is an outlet pipe 19 opening into the interior of the tower and through the cup, and disposed over this pipe is a hood 20, the lower end of which is provided with the inlet perforations or notches 21. By this means a seal is provided preventing the escape of gases or vapors from the upper end of the tower, but permitting the passage of liquid downward through the top of the tower. Liquid flows downward through the tower in the form of small streams, and from the bottom of the tower extends a discharge pipe 22 which discharges into a receptacle or tank 23 provided with a heating coil 24 connected in any suitable manner to a source of heat, as for instance, steam.

Disposed above the tower 3 is a tank 25, of exactly the same construction as the tank 6, and disposed above the tower 4 is a tank 26 of the same character as the tank 25. Each of these tanks 25 and 26 is provided with an outlet pipe, designated 27, these outlet pipes being constructed in the same manner as the outlet pipe 10 and provided with a valve. Each outlet pipe discharges into a distributing pan or tank 28 provided with a plurality of discharge nozzles, each of these nozzles being formed in the same manner as the nozzle 17, previously described and each nozzle emptying into a cup 30 provided with the discharge pipe 31 and the hood 32.

From the tank 23 there extends upward a pipe 33 which discharges into the tank 25, the liquid from the tank 23 being pumped up into the tank 25 by means of a centrifugal pump 34. The tower 3 is provided at its lower end with the discharge pipe 35 which discharges into the receiving tank 36 which is constructed in the same manner as the tank 23 and is provided with the steam coil 37. From the tank 26 extends upward the delivery pipe 38 which at its upper end, discharges into the tank 26 and which is connected to the centrifugal pump 39. A pipe 40 also extends upward from tank 36 to the tank 25 and is provided with the centrifugal pump 41. The purpose of this pipe is to take liquid from the tank 36 and pass it again through the tower 3.

Heat is supplied to the tower 4, as will be later stated, and hot gases and products of combustion are conducted from the upper portion of this tower by means of a pipe 42 to the lower portion of the tower 3, this pipe 42 being of relatively large size. From the upper portion of the tower 3 extends a conducting pipe 43 which extends downward and opens into the lower end of the tower 2. From the upper end of the tower 2 extends a relatively small pipe 44 which is provided with condensing coils 45 and it then extends upward and opens into the atmosphere, as at 46. This pipe 45, where it extends upward, is provided with the damper or valve 47 whereby the outlet may be controlled. The coils 45 are disposed in a condensing chamber or tank 48 of any suitable character. A damper 49 or valve is also provided between the upper end of the tower 2 and the coils 45. Each of the tanks 6, 25 and 26 are provided with the counter-weighted emergency plugs 14.

The towers 2 and 3 are intended for the concentration of relatively weak acid of a strength less than 65%, and therefore are provided with a lead lining. The tower 4, however, is designed for the final concentration of acid having a strength greater than 65%, and therefore is made of iron. The iron composing the tower 2 is formed of flanged sections bolted together and superposed one upon the other. The base section of the tower, designated 50, is composed of an iron shell preferably rectangular in form. This shell has at one end an opening 51 for connection to an auxiliary furnace, designated generally 52. This base section 50 is supported in spaced relation to the top wall of the furnace 5 by means of iron columns or supports 53, these columns being shown as rectangular in plan and tapering upward and engaging beneath the upper flange 54 of the base section 50.

Formed within the base section 50 and carried thereby are a plurality of parallel transversely extending arches 55 of cast iron, these arches being spaced from each other a distance equal to half the length of a brick and supported upon these arches is the brick filling 56, these bricks being laid in staggered relation or in what is known as pigeon-hole formation so as to break joints and thus leave small openings vertically traversing each layer of brick but not disposed in alinement with each other so that as the acid descends it will be separated into fine sprays or streams and will thus be subjected to the action of the uprising column of hot gases or products of combustion. Upon the upper layer of bricks is disposed a layer of finely broken quartz, designated 57. This layer of quartz is disposed slightly above the bottom of the upper section of the tower so as to be spaced from the depending ends of the distributer pipes 17.

Removably disposed below the bottom section 50 of the tower is a receiving pan 58 which is of iron. This receiving pan rests upon the upper walls of the furnace 5 and is of such height that it may be slid into or out of place between the upper wall of the furnace and the lower end of the section 50. When this pan is positioned, it is preferably surrounded by a brick wall 59, this brick wall being removable on one side so as to permit the removal of the pan, and the pan is provided with the overflow pocket 60 from which extends a discharge pipe 61, provided with the coupling 62 whereby it may be detachably connected to a pipe 63 leading into a receiving tank 64 having the same form as the tanks 23 and 36 and provided with the steam coils 65. From this tank 65 extends a siphon 66 which discharges into a cooling tank 67 surrounded by water or other cooling fluid contained in a tank 68, and from this tank 67 extends a siphon pipe 69 discharging into a tank 70 in turn surrounded by a cooling fluid. The concentrated acid may be discharged from tank 70 in any suitable manner, as by means of a pipe 71.

Disposed in conjunction with the lower section 50 of the tower 4 is the furnace 52, previously referred to. This furnace may be constructed in any suitable manner, but is shown as provided with the body portion 73 and a neck 74 which connects with the wall of the tower 4 below the arches 55. Preferably the fire-hole of the furnace is provided with the perforated front plate 75 and the sliding door 76 supported by means of the counterweight 77.

The operation of my invention is obvious to those who are acquainted with the concentration of sulfuric acid. The hot gases and products of combustion from the furnace 52 pass into the tower 4 and up through the brickwork filling of the tower, thence into the pipe 42, thence up through the tower 3, thence through the pipe 43 into the tower 2 and upward through this tower, the products of combustion, with the water and weak distillate, passing out through the pipe 44 and being condensed in the condenser 48 and being eventually passed off through the outlet 46. The relatively weak acid in the tank 8 is passed up into the tank 6, and from there passes into the distributer 12 and descends in the tower 2 in the form of fine streams. This relatively weak acid in its downward passage meets the upwardly moving column of hot gases and products of combustion and this acts to concentrate the acid. The liquid acid eventually falls to the bottom of the column 2 and thence is delivered into the tank 23 where it is kept at a certain definite temperature. It is then pumped up through the pipe 33 into the tank 25 and descends, as before described, in the form of fine streams through the second concentrating tower 3, where it is again subjected to heat which is, of course, somewhat more intense than the heat to which it has been subjected in the tower 2, and the more concentrated acid passes off through the outlet pipe 35 to the tank 36. If the acid from the tower 3 is not sufficiently concentrated to be passed into the tower 4, it may be pumped up through the pipe 40 to again pass through tower 3 until sufficient concentration has been reached. The acid from the tank 36 is carried upward by the pipe 38 into the tank 26 and from there is delivered into the tower 4, descending therein in the form of fine streams until it reaches the quartz layer 57. There the acid is broken up and descends in the form of finely divided sprays or streamlets through the brick filling and is constantly subjected to the relatively highly heated gases coming directly from the furnace 52. A pipe 40$^a$ extends from the tank 64 and discharges into the tank 26. This pipe is connected to a pump 39$^a$. Thus if the acid in the tower 4 is too weak to be discharged into the tank 67, it is passed rapidly through the tower 4 until the required strength is attained. This concentrated acid is then passed into the cooler 67. The furnace 5 is disposed only beneath the tower 4 and is for burning oil to heat the pan in the bottom of the tower 4. It is required to be used, however, only occasionally. The furnace 52 burns coke or other fuel of like nature. This furnace is provided with the usual clean-out door, a feed door which can be raised and lowered by means of pulleys and is provided with the usual means whereby the fire may be dumped, air supplied and the hot cinders from being blown about. The emergency plugs 14 are so mounted, as previously described, that these plugs can be raised high enough to let the acid flow freely into the outlet pipe and should the neck of the outlet pipe leak, it can then be repaired so as to stop this leak, without emptying the tank, thereby avoiding delay. It will be seen that as the acid is descending from the bottom of the towers 2 and 3, it is subjected to the heat of the gases, passing upward through these towers. In the tower 4 the liquid descends into the pan 58 and thence passes into the tank 64 from which it is drawn off into the cooling tanks 67 and 70. The first tower, No. 2, will have cold acid carried to it so as to weaken as much as possible the fumes passing out through the discharge pipe 44 so that these fumes from this plant may be condensed before passing through the exit pipe 46. As a matter of fact, however, there will be very little fumes escaping from this plant. If the bottom of the pan 58 should leak for any reason, the pan may be removed and replaced without disturbing the brick lining in the tower.

Having described my invention, what I claim is:

1. In a plant for concentrating sulfuric acid, a concentrating tower, means for causing the descent of sulfuric acid in fine streams downward through the tower, means for discharging products of combustion at a high temperature in the lower end of the tower, a pan disposed at the lower end of the tower, and means for applying heat beneath the pan.

2. In a plant for concentrating sulfuric acid, a plurality of towers, a plurality of tanks one for each tower, means for pumping sulfuric acid to be concentrated from each tank into its corresponding tower, means for causing the acid to descend through the corresponding tower in the form of fine streams and passing the liquid caught at the lower end of the tower into the tank for the next successive tower, a final concentrating tower, a receiving pan therein, means for passing the acid to be concentrated into the upper portion of the final concentrating tower and causing it to descend therein in fine streams, a furnace connected to the final concentrating tower and having a flue discharging into the lower portion of the tower, flues connecting the upper portion of each tower to the lower portion of the next successive tower in advance whereby to cause the heated products of combustion from the concentrating tower to pass in succession through the several towers in a course reverse to that of the descending stream and means for applying heat beneath the receiving pan of the final concentrating tower.

3. A sulfuric concentrating plant including a tower formed of metallic sections, columns supporting sections of the tower in spaced relation to the base of the tower, a lead pan removably disposed below the lower section and less in height than the space between the base and the lower section, and a wall extending around three sides of the lead pan and preventing the dissipation of heat therefrom.

4. A sulfuric acid plant including a concentrating tower formed of metallic sections, columns supporting the sections of the tower in spaced relation to the base thereof, arches extending across the lowest section of the tower and adapted to support a refractory packing, a furnace disposed in connection with said concentrating tower and having a flue opening into the lowest section of the tower, and a lead pan removably disposed below the lowest section of the tower and disposed between the column supporting said tower whereby the pan may be slid laterally from beneath the tower.

In testimony whereof I hereunto affix my signature in the presence of two witnesses.

THOMAS KILROY.

Witnesses:
JAMES BONNER,
STEPHEN McCARTHY.